US011922856B2

(12) United States Patent
Ato

(10) Patent No.: US 11,922,856 B2
(45) Date of Patent: Mar. 5, 2024

(54) LIGHT TRANSMISSIVE DISPLAY DEVICE AND DIMMING METHOD

(71) Applicant: SONY GROUP CORPORATION, Tokyo (JP)

(72) Inventor: Masayuki Ato, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 127 days.

(21) Appl. No.: 17/609,457

(22) PCT Filed: May 8, 2020

(86) PCT No.: PCT/JP2020/018738
§ 371 (c)(1),
(2) Date: Nov. 8, 2021

(87) PCT Pub. No.: WO2020/230744
PCT Pub. Date: Nov. 19, 2020

(65) Prior Publication Data
US 2022/0230579 A1 Jul. 21, 2022

(30) Foreign Application Priority Data
May 16, 2019 (JP) .................... 2019-092653

(51) Int. Cl.
*G09G 3/20* (2006.01)
*G02B 27/01* (2006.01)
(Continued)

(52) U.S. Cl.
CPC ....... *G09G 3/2096* (2013.01); *G02B 27/0172* (2013.01); *G02F 1/133606* (2013.01);
(Continued)

(58) Field of Classification Search
CPC .............. G09G 3/2096; G09G 2370/16; G02F 1/133612; G02F 1/133606; G02F 1/163; G02B 27/0172; G02B 2027/014
See application file for complete search history.

(56) References Cited

U.S. PATENT DOCUMENTS

| 6,031,500 A * | 2/2000 | Nagy .................. H01Q 1/1278 428/210 |
| 2013/0147859 A1* | 6/2013 | Kobayashi .............. G09G 5/10 345/690 |
| 2018/0090992 A1* | 3/2018 | Shrivastava ............ H02J 50/20 |

FOREIGN PATENT DOCUMENTS

| JP | 50-042684 Y1 | 12/1975 |
| JP | 63-271320 A | 11/1988 |

(Continued)

OTHER PUBLICATIONS

International Search Report and Written Opinion of PCT Application No. PCT/JP2020/018738, dated Jul. 28, 2020, 13 pages of ISRWO.

*Primary Examiner* — Towfiq Elahi
(74) *Attorney, Agent, or Firm* — CHIP LAW GROUP

(57) ABSTRACT

According to the present disclosure, there is provided a light transmissive display device including a conductor to which a voltage for changing transmittance of the dimming element and a voltage outputting an electromagnetic wave for communication are applied in a time division manner, and a light transmitting member that is provided with a conductor and transmits light passing through the dimming element. This configuration makes it possible to suppress a space occupied by the dimming element and the antenna in a configuration including the dimming element and the antenna.

17 Claims, 8 Drawing Sheets

(51) Int. Cl.
*G02F 1/1335* (2006.01)
*G02F 1/13357* (2006.01)
*G02F 1/163* (2006.01)

(52) U.S. Cl.
CPC ........ *G02F 1/133612* (2021.01); *G02F 1/163* (2013.01); *G02B 2027/014* (2013.01); *G09G 2370/16* (2013.01)

(56) References Cited

FOREIGN PATENT DOCUMENTS

| | | | | |
|---|---|---|---|---|
| JP | 63271320 A | * | 11/1988 | ......... G02F 1/15502 |
| JP | 2012-248982 A | | 12/2012 | |
| JP | 5884576 B2 | | 3/2016 | |

\* cited by examiner

FIG.4

<TRANSMITTANCE TABLE>
SET VALUE/TOLERANCE VALUE FOR
TRANSMITTANCE vs DIMMING ON TIME/RF ON TIME

| SET VALUE FOR TRANS-MITTANCE % | TOLERANCE VALUE FOR TRANSMIT-TANCE % | DIMMING ON TIME [s] | RF ON TIME [s] |
|---|---|---|---|
| 70 | 77 | 5 | 70 |
| 60 | 66 | 5 | 60 |
| 50 | 55 | 5 | 50 |
| 40 | 44 | 5 | 40 |
| 30 | 33 | 5 | 30 |
| 20 | 22 | 5 | 20 |
| 10 | 11 | 5 | 10 |
| 5 | 5.5 | 5 | 5 |

FIG.5

<VARIATION CORRECTION TABLE,
CORRECTION EXAMPLES OF ELEMENTS ID: 1 TO ID: 3>
SET VALUE FOR TRANSMITTANCE vs
DRIVE VOLTAGE VALUE FOR DIMMING ELEMENT

|  | SET VALUE FOR TRANSMITTANCE | | |
|---|---|---|---|
|  | 5% | 10% | 20% |
| ELEMENT ID: 1 | 1.5V | 1.2V | 0.9V |
| 2 | 1.4V | 1.1V | 0.8V |
| 3 | 1.7V | 1.4V | 1.1V |
| (DESIGN TARGET) | 1.5V | 1.2V | 0.9V |

FIG.6

<LIGHT SENSOR TABLE>
VALUE OF AMBIENT LIGHT SENSOR vs
SET VALUE FOR TRANSMITTANCE

| VALUE OF LIGHT SENSOR | SET VALUE FOR TRANSMITTANCE % |
|---|---|
| 100 | 5.0 |
| 80 | 6.3 |
| 60 | 8.3 |
| 40 | 12.5 |
| 20 | 25.0 |

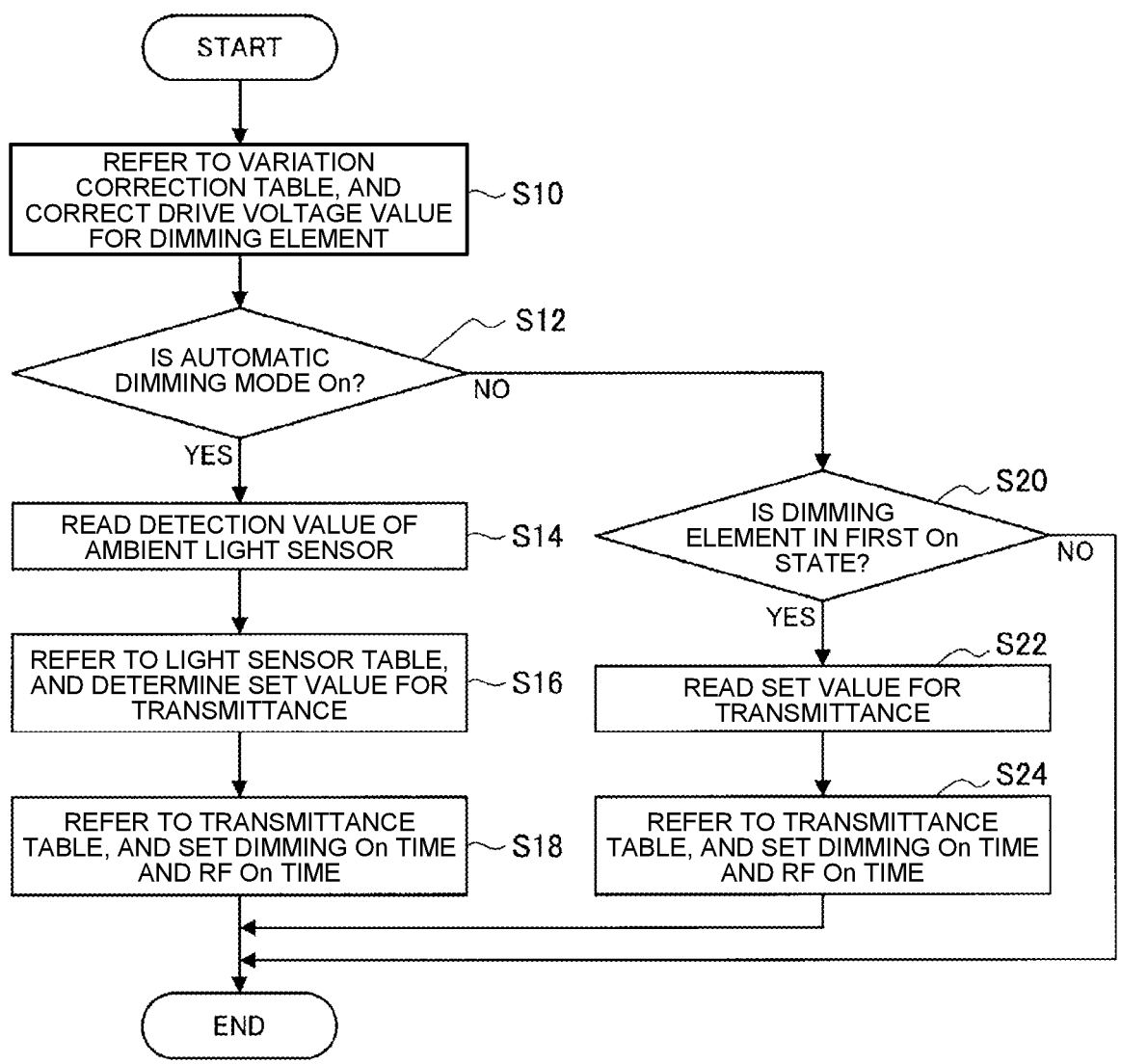

LIGHT TRANSMISSIVE DISPLAY DEVICE AND DIMMING METHOD

CROSS REFERENCE TO RELATED APPLICATIONS

This application is a U.S. National Phase of International Patent Application No. PCT/JP2020/018738 filed on May 8, 2020, which claims priority benefit of Japanese Patent Application No. JP 2019-092653 filed in the Japan Patent Office on May 16, 2019. Each of the above-referenced applications is hereby incorporated herein by reference in its entirety.

FIELD

The present disclosure relates to a light transmissive display device, a dimming method, and a program.

BACKGROUND

Patent Literature 1 below describes conventional display devices, such as head mount displays (HMDs), that are mounted on the heads of users are configured to change the transmittance of displays to adjust the amounts of external light, providing images that are clear for the users to view.

CITATION LIST

Patent Literature

Patent Literature 1: JP 5884576 B2

SUMMARY

Technical Problem

In some cases, these display devices have a communication function for wirelessly communication with the outside. In this configuration, each of the display devices includes an antenna for wireless communication. Meanwhile, when the display device includes the antenna for wireless communication together with a dimming element for changing the transmittance, a space occupied by these members is restricted, causing problems that a function of communication through the antenna deteriorates or the function of the dimming element decreases. In addition, when the space occupied by these members increases, a problem is caused that an effective space for arrangement of other components decreases.

Therefore, in the configuration including the dimming element and the antenna, it has been required to suppress the space occupied by the dimming element and the antenna.

Solution to Problem

According to the present disclosure, a light transmissive display device is provided that includes: a conductor to which a voltage for changing transmittance of the dimming element and a voltage outputting an electromagnetic wave for communication are applied in a time division manner; and a light transmitting member that is provided with a conductor and transmits light passing through the dimming element.

Moreover, according to the present disclosure, a dimming method is provided that includes: causing a conductor to function as a dimming element that changes transmittance, in a first period of time; and causing the conductor to function as an antenna for communication, in a second period of time.

Moreover, according to the present disclosure, a program is provided that causes a computer to function as: a unit causing a conductor to function as a dimming element changing transmittance, in a first period of time; and a unit causing the conductor to function as an antenna for communication, in a second period of time.

BRIEF DESCRIPTION OF DRAWINGS

FIG. 4 is a schematic diagram illustrating a "transmittance table" showing a correspondence table between the transmittance, and an on time during which V1 is applied.

FIG. 5 is a schematic diagram illustrating an example of a correction table.

FIG. 6 is a table illustrating a correspondence relationship between detection values of an ambient light sensor and set values for transmittance.

FIG. 9 is a flowchart illustrating a process performed by the system of FIG. 8.

DESCRIPTION OF EMBODIMENTS

Figure 1:
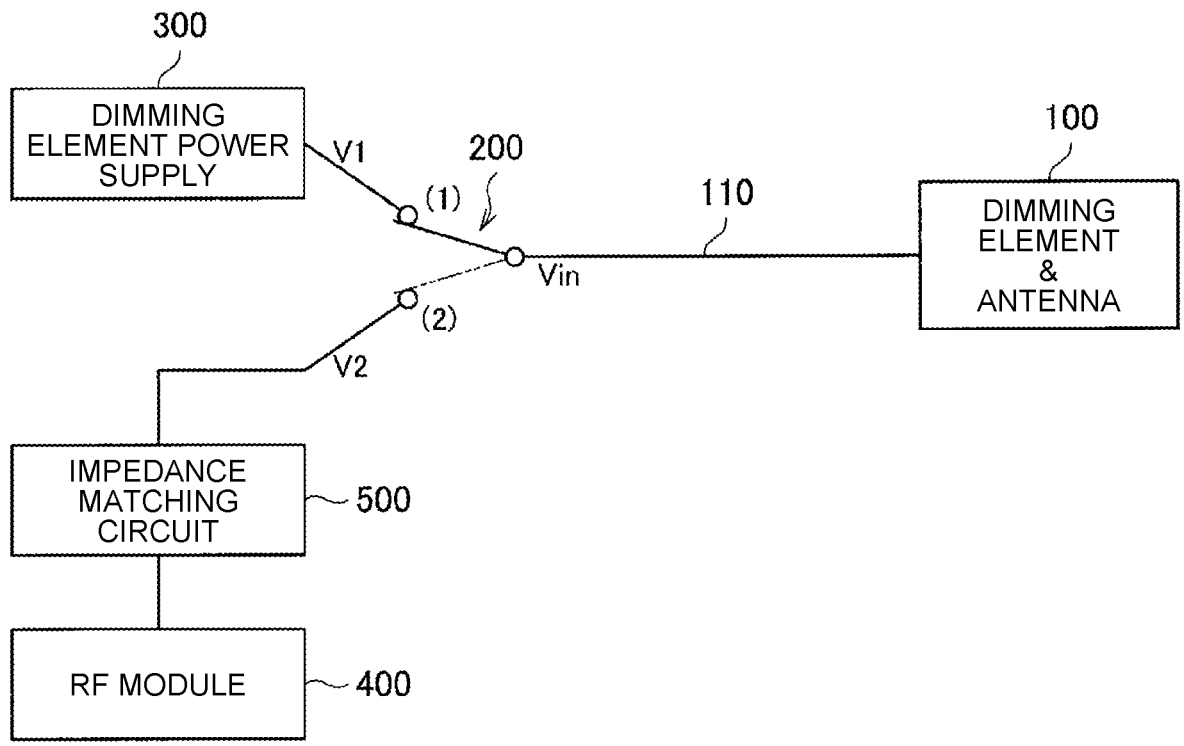
FIG. 1 is a schematic diagram illustrating switching between electrode wiring of a dimming element and pattern wiring for an antenna, by a switch.

Preferred embodiments of the present disclosure will be described in detail below with reference to the accompanying drawings. Note that in the present specification and the drawings, component elements having substantially the same functional configurations are denoted by the same reference symbols and numerals, and redundant descriptions thereof will be omitted.

Note that the description will be given in the following order.

1. Overview
2. Switching between electrode wiring of dimming element and pattern wiring for antenna, by switch
3. Set value and tolerance value for transmittance of dimming element
4. Correction of variation in manufacturing dimming elements
5. Control by automatic dimming
6. Examples of antenna pattern
7. Configuration example of system
8. Process performed in system
9. Adaptation of period of time for dimming and antenna
10. Examples of dimming element
11. Conclusion

1. Overview

In the present embodiment, assuming a transmissive display device (also referred to as see-through display glasses, smart glasses, or the like.), such as an HMD, that is mounted on a head of a user, and in the transmissive display device, a dimming element is mounted on a combiner (glass portion) and the dimming element has a variable transmittance so that the transmissive display device could be used as sunglasses. The transmittance adjusted by the dimming element makes it possible to make display content clear to view even under an environmental condition such as direct sunlight.

Meanwhile, the display device includes an antenna for external communication that performs external wireless communication, for example, for display according to a result of the communication. In the present embodiment, electrode wiring of the dimming element and an antenna pattern are constituted by the same conductor, the electrode wiring of the dimming element and the antenna pattern are switched by a switch, and a drive voltage value is dynamically changed in synchronization with the switching.

2. Switching Between Electrode Wiring of Dimming Element and Pattern Wiring for Antenna, by Switch FIG. 1 is a schematic diagram illustrating a configuration example relating to switching between the electrode wiring of the dimming element and pattern wiring for the antenna by the switch, according to the present embodiment. The conductor 100 illustrated in FIG. 1 serves as both the electrode wiring of the dimming element and the antenna. The conductor 100 is connected to the switch 200 via wiring 110. The conductor 100 is connected to a dimming element power supply 300 or an RF module 400 via the switch 200. When the conductor 100 is connected to the RF module 400, the conductor 100 is connected to the RF module 400 via an impedance matching circuit 500. Reflection due to a difference in impedance is suppressed by the impedance matching circuit 500 as much as possible. In addition, the conductor 100 is connected to the RF module 400 to output an electromagnetic wave for communication, and thus, operate as the antenna.

The dimming element power supply 300 is driven with a direct current voltage being a first voltage (DC drive) to output an output voltage V1 to the switch 200. Meanwhile, the RF module 400 is driven with an alternating current voltage being a second voltage (AC drive) to output an output voltage V2 to the switch 200. In the connection of the conductor 100 to the dimming element power supply 300 or the RF module 400, the switch 200 is operated to switch paths in a time division manner. Therefore, the conductor 100 is connected to one of the dimming element power supply 300 and the RF module 400 in the time division manner. In synchronization with switching paths, voltage Vin of the wiring 110 dynamically changes between V1 (the DC drive) and V2 (the AC drive).

Note that the dimming element power supply 300 has a wiring impedance of 0Ω, and thus, provides a fast response. Meanwhile, although the RF module 400 has a wiring impedance of about 50Ω, reflection due to the difference in impedance is suppressed as much as possible by the impedance matching circuit 500.

Figure 2:
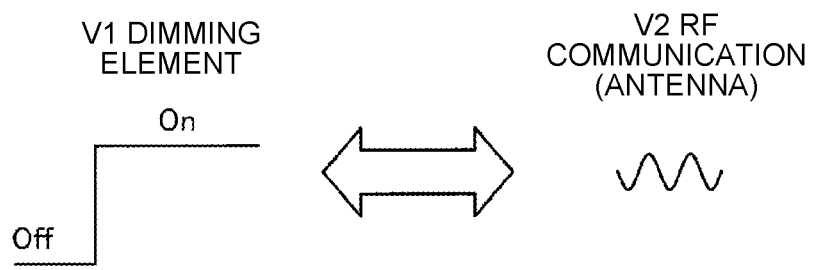
FIG. 2 is a schematic diagram illustrating dynamic change in voltage Vin.

FIG. 2 is a schematic diagram illustrating a dynamic change in the voltage Vin applied to the conductor 100 via the wiring 110. As illustrated in FIG. 2, when the voltage V1 from the dimming element power supply 300 is applied to the conductor 100, the dynamic change of the voltage V1 is alternately switched between off and on. In other words, the voltage V1 is applied to the conductor 100, as a rectangular wave.

Furthermore, when the voltage V2 from the RF module 400 is applied to the conductor 100, the dynamic change of the voltage V2 shows an AC waveform (alternating current waveform) for RF communication. The voltage V2 is a relatively weak voltage. The voltage V2 is an AC waveform voltage, and thus, the conductor 100 is operable as the antenna.

3. Set Value and Tolerance Value for Transmittance of Dimming Element

As described above, when the conductor 100 serves as both the dimming element and the antenna, the voltage V1 and the voltage V2 are applied to the conductor 100 in the time division manner. At this time, if an off-state of the drive voltage for the dimming element is maintained for a long time in a section in which the conductor 100 is operated as the antenna, the transmittance of the dimming element returns to a maximum value, and the user perceives a change in the transmittance. Therefore, an on time of the dimming element and an on time of the RF communication are adjusted so that the user is less likely to feel the change in the transmittance and further the transmittance falls below a predetermined tolerance value. At this time, the transmittance changes with time between the set value and the predetermined tolerance value. Note that the tolerance value may be an actual measurement value obtained by subjective evaluation. The drive of the dimming element is inserted into the RF communication in the time division manner, and thus, the RF communication is communication performed at time intervals such as a beacon. The set value and the predetermined tolerance value may be set by the user, or may be set on the basis of information acquired from various sensors such as an illuminance sensor and a gyroscope sensor. For example, user input is set by a touch input to a touch pad mounted on the HMD or recognition of a user's gesture by an imaging device mounted on the HMD.

Figure 3:
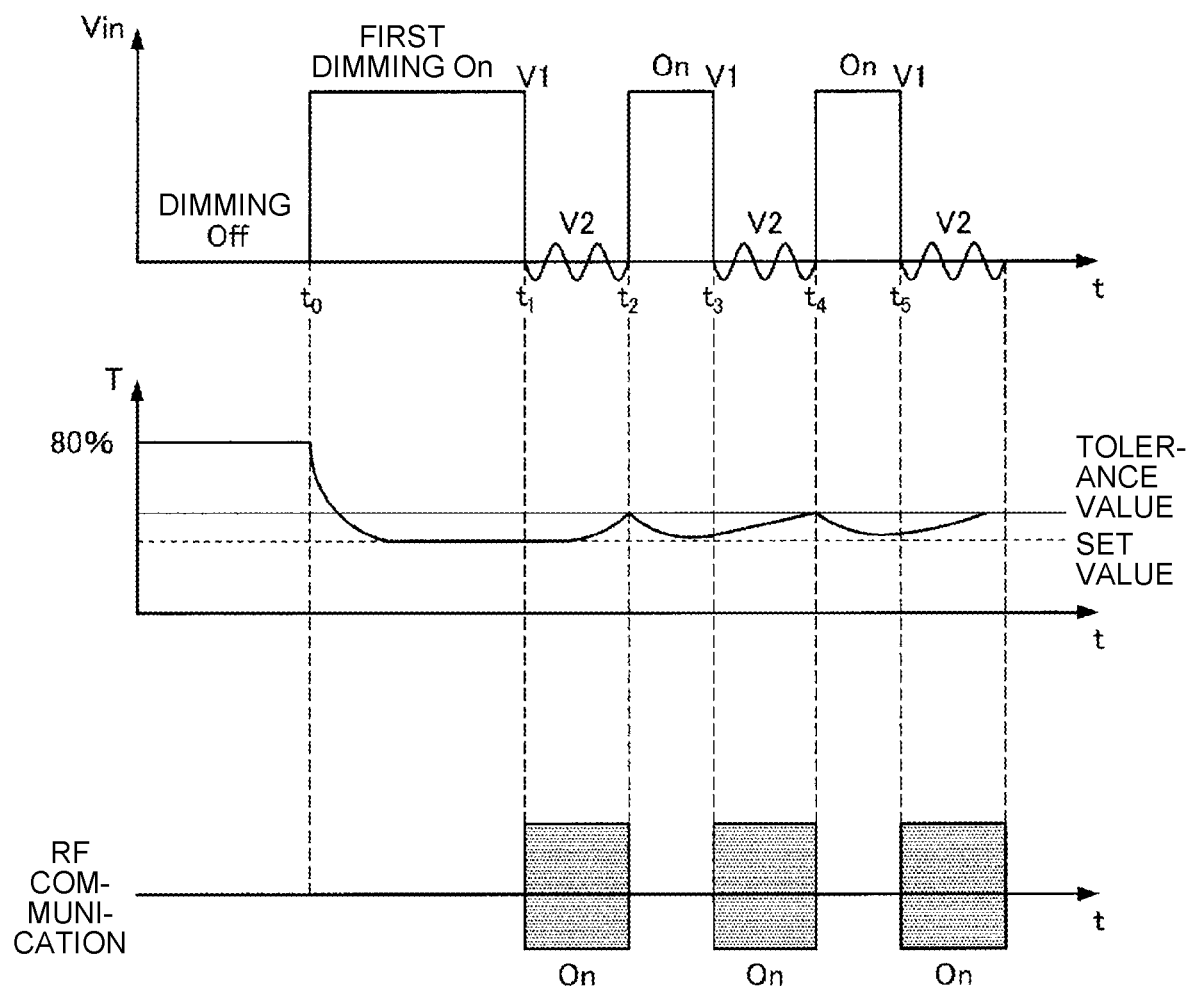
FIG. 3 is a characteristic diagram illustrating time waveforms showing a relationship between voltage Vin to wiring, transmittance T, and on-state of RF communication.

FIG. 3 is a characteristic diagram illustrating time waveforms showing a relationship between the voltage Vin applied to the conductor 100 via the wiring 110, the transmittance T of the dimming element, and the on time of the RF communication. As illustrated in FIG. 3, the dimming element is off until time t0, and the transmittance of the dimming element is approximately 80%. When the first dimming is turned on at the time t0, the voltage V1 (the DC drive) is applied to the conductor 100. Therefore, the transmittance T decreases to the set value.

Next, at time t1, application of the voltage V1 to the conductor 100 is turned off, and the voltage V2 (the AC drive) is applied to the conductor 100. Thereafter, the voltage V1 (the DC drive) is applied to the conductor 100 at time t2. During a period from the time t1 to the time t2, the application of the voltage V1 to the conductor 100 is turned off, and thus, the transmittance T rises from the set value to the tolerance value. Thereafter, the voltage V2 (the AC drive) is applied to the conductor 100 at time t3.

As described above, when the drive voltage value is 0 V for a long time, the transmittance of the dimming element returns to the maximum value, and the user perceives a change in the transmittance. Therefore, the on time of the dimming element and the on time of the RF communication are adjusted so that the user is less likely to feel the change in the transmittance and further the set value for the transmittance falls below the tolerance value. Furthermore, the on time of the dimming element is defined as a first period of time, and the on time of the RF communication is defined as a second period of time.

Furthermore, the voltage V1 (the DC drive) is applied to the conductor 100 at time t4, and the voltage V2 (the AC drive) is applied to the conductor 100 at time t5. After the time t5, the voltages V1 and V2 are alternately applied to the conductor 100. The dimming element is turned on during the time t0 to t1, t2 to t3, and t4 to t5. Meanwhile, the antenna is turned on during the time t1 to t2 and t3 to t4, and from the time t5. As described above, the application of the voltages V1 and V2 to the conductor 100 in the time division manner makes it possible to cause the conductor 100 to operate as the dimming element and the antenna.

The on time for applying the voltage V1 to the conductor 100 changes according to the set value for the transmittance of the dimming element, depending on the characteristics of the dimming element constituted by the conductor 100. FIG. 4 is a schematic diagram illustrating a "transmittance table" showing a correspondence table between the transmittance of the dimming element, a dimming on time during which the voltage V1 is applied to the conductor 100, and an RF on time during which an RF antenna is turned on.

The "transmittance table" illustrated in FIG. 4 defines a relationship between the set value for the transmittance [%], the tolerance value for the transmittance [%], the dimming on time [s] during which the dimming element is turned on, and the RF on time [s] during which the RF antenna is turned on. In the example illustrated in FIG. 4, the tolerance value for the transmittance has a value increased by 10% of the set value for the transmittance. Note that a dimming off time during which the dimming element is turned off corresponds to the RF on time, and an RF-off time during which the RF antenna is turned off corresponds to the dimming on time.

As illustrated in FIG. 3, when the RF antenna is turned on and the application of the voltage V1 to the conductor 100 is turned off, the transmittance T rises from the set value to the tolerance value. At this time, the tolerance value for the transmittance is set to be increased by 10% or less of the set value for the transmittance, and thus, the transmittance does not exceed the tolerance value when the voltage V2 is applied to the conductor 100, suppressing the user from perceiving the change in the transmittance.

Furthermore, in the example illustrated in FIG. 4, the dimming on time during which the voltage V1 is applied to the conductor 100 is constantly set to five seconds. Furthermore, the RF on time during which the voltage V2 is applied to the conductor 100 is determined according to the set value for the transmittance, and in the example of FIG. 4, the RF on time is set to the same value as the set value for the transmittance. Therefore, the length of the period of time in which the voltage is applied to the RF antenna changes according to the transmittance. As shown in the transmittance table of FIG. 4, the higher the transmittance, the longer the RF on time.

In FIG. 4, the relationship between the tolerance value for the transmittance and the RF on time with respect to the set value for the transmittance can be expressed by the following formula. In the following formula, the set value for the transmittance is $\chi$[%], the tolerance value for the transmittance is Yt [%], and the RF on time is Yr [s].

$$Yt=\chi \times 1.1$$

$$Yr=\chi$$

Note that the "transmittance table" illustrated in FIG. 4 is an example, and the relationship between the set value for the transmittance, the tolerance value for the transmittance, the dimming on time, and the RF on time is not limited to the example illustrated in FIG. 4.

Furthermore, for example, when it is not necessary to reduce the transmittance of the dimming element, such as use in a dark place, the conductor 100 may not be used as wiring for changing the transmittance of the dimming element but be used only as the antenna. In this configuration, the dimming on time is zero. Furthermore, for example, for use in an airplane mode or the like, the conductor 100 may not be used as the antenna but be used as the wiring applying a voltage to the dimming element. In this configuration, the RF on time is zero. As described above, when the conductor 100 is used as either the RF antenna or the dimming element, the switching in the time division manner by the switch 200 is not required.

4. Correction of Variation in Manufacturing Dimming Elements

A variation in the drive voltage value for the dimming element relative to the set value for the transmittance is caused, according to a variation in manufacturing the conductors 100 used as the wiring applying a voltage to the dimming element. Therefore, a correction table for the drive voltage values to the set values for the transmittance is provided according to the variation in manufacturing the dimming elements, correcting the variation on the basis of the correction table.

FIG. 5 is a schematic diagram illustrating an example of a variation correction table. FIG. 5 illustrates an example of the table for correcting the variation in the drive voltage values for the dimming elements with respect to the set values 5%, 10%, and 20% for the transmittance. FIG. 5 illustrates a design target (design value) of the drive voltage value with respect to each of the set values (5%, 10%, and 20%) for the transmittance and an actual drive voltage value for each of three dimming elements (ID: 1 to 3).

As illustrated in FIG. 5, for a dimming element with ID: 1, the design target of the drive voltage value and the actual drive voltage value match. Meanwhile, for a dimming element with ID: 2, the design target of the drive voltage value with respect to the set value for the transmittance 5% is 1.5 V, whereas the actual drive voltage value is 1.4 V. In addition, for a dimming element with ID: 3, the design target of the drive voltage value with respect to the set value 5% for the transmittance is 1.5 V, whereas the actual drive voltage value is 1.7 V. Therefore, with respect to the drive voltage of 1.5 V as the design target, 1.5 V is applied to drive the dimming element with ID: 1, 1.4 V is applied to drive the dimming element with ID: 2, and 1.7 V is applied to drive the dimming element with ID: 3. Thus, the set value for the transmittance can be set to 5% in any of the dimming elements.

More specifically, in the display device having the dimming element with ID: 1, the drive voltage values indicated in the row of ID: 1 in FIG. 5 are acquired in manufacturing and stored in a variation correction table. Likewise, in the display device having the dimming element with ID: 2, the drive voltage values in the row of ID: 2 in FIG. 5 are acquired in manufacturing and stored in the variation correction table, and in the display device having the dimming element with ID: 3, the drive voltage values in the row of ID: 3 in FIG. 5 are acquired in manufacturing and stored in the variation correction table. Then, in each of the display devices having the dimming element with ID: 1 to ID: 3, during dimming by the dimming element, the drive voltage value stored in the variation correction table is applied to the dimming element, according to the set value (5%, 10%, or 20%) for the transmittance.

As described above, the variation in the drive voltage values to the set values for the transmittance occurs due to the variation in manufacturing the dimming elements. Therefore, for the respective dimming elements, the variation correction table for correcting the drive voltage values with respect to the set values for the transmittance is provided to correct the variation. The variation correction table is stored in each display device, and thus, the set value for the transmittance can be set to a desired value in consideration of the variation in manufacturing the dimming elements.

5. Control by Automatic Dimming

In the present embodiment, it is possible to provide an operation mode (automatic dimming mode) in which the transmittance is automatically changed according to the brightness of external ambient light. In this mode, an ambient light sensor that is incorporated in the display device is used to automatically adjust the set value for the transmittance, according to a detection value of the ambient light sensor.

FIG. 6 is a table illustrating a correspondence relationship between the detection values of the ambient light sensor and set values for the transmittance. As illustrated in FIG. 6, the larger the detection value of the ambient light sensor, that is, the brighter the external ambient light, the lower the set value for the transmittance. Therefore, the transmittance is lowered as the outside is brighter, and thus, for example, the display device can be comfortably used even under direct sunlight, and visibility of display on the display device can be improved.

As described above, in the automatic dimming mode in which the transmittance automatically changes according to the brightness of the ambient light, the ambient light sensor incorporated in the display device can be used to automatically adjust the set value for the transmittance, according to the detection value of the ambient light sensor.

6. Examples of Antenna Pattern

Figure 7A:
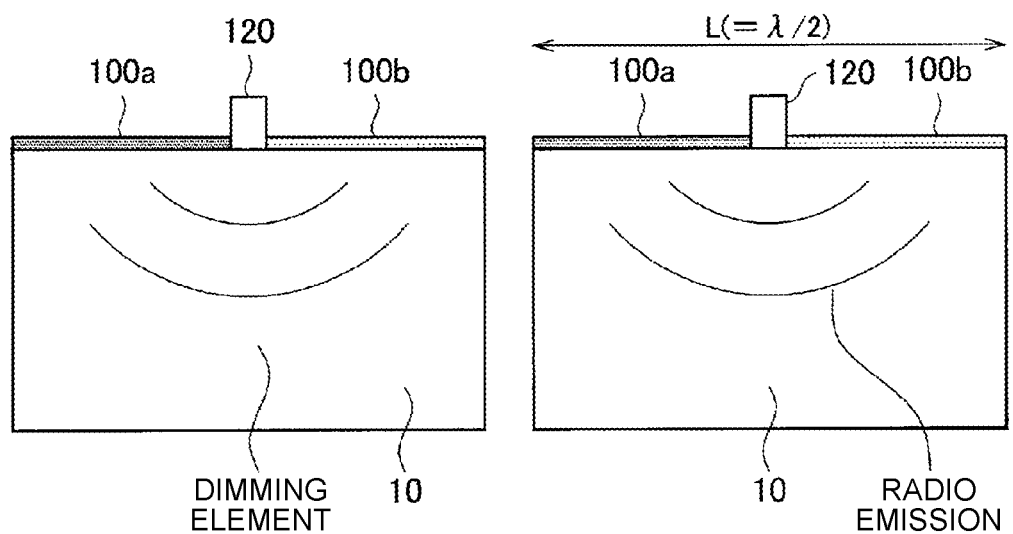
FIG. 7A is a schematic diagram illustrating an example of an antenna pattern.

FIGS. 7A, 7B, 7C, and 7D are schematic diagrams illustrating examples of antenna patterns. FIGS. 7A, 7B, 7C, and 7D each illustrate a state in which the display device is viewed from the front. FIG. 7A illustrates a basic form of the antenna pattern, and illustrates an example in which the dimming element is formed on each of two combiners (light transmitting members) 10. Each of the two combiners 10 is attached to each of the right eye and the left eye of the user.

The basic form illustrated in FIG. 7A includes two conductors 100a and 100b and a connector 120 that is arranged at the midpoint of an upper portion of the combiner 10. On the left side of FIG. 7A, the conductors 100a and 100b are illustrated that are used as the wiring applying a voltage to the dimming element, and on the right side, the conductors 100a and 100b are illustrated that are used as the RF antenna.

In FIG. 7A, when the conductors 100a and 100b are used as the wirings applying a voltage to the dimming element, one conductor 100a is a positive electrode and the other conductor 100b is a negative electrode. When the conductors 100a and 100b are used as the RF antenna, the conductors 100a and 100b function as the antenna pattern.

On the right side of FIG. 7A, L indicates a dipole antenna length and is set to approximately 0.5 cm to 15 cm. When L is converted into a frequency, L is approximately 2 GHz to 60 GHz. Therefore, the antenna pattern of basic form, illustrated in FIG. 7A, is applicable to Bluetooth (registered trademark) (BT), Wi-Fi, millimeter wave communication, and the like. Note that, for the sake of convenience, the relative permittivity of the dimming element is set to 1.0. Furthermore, in FIG. 7A, the directivity of the antenna is horizontal to the ground.

Figure 7B:
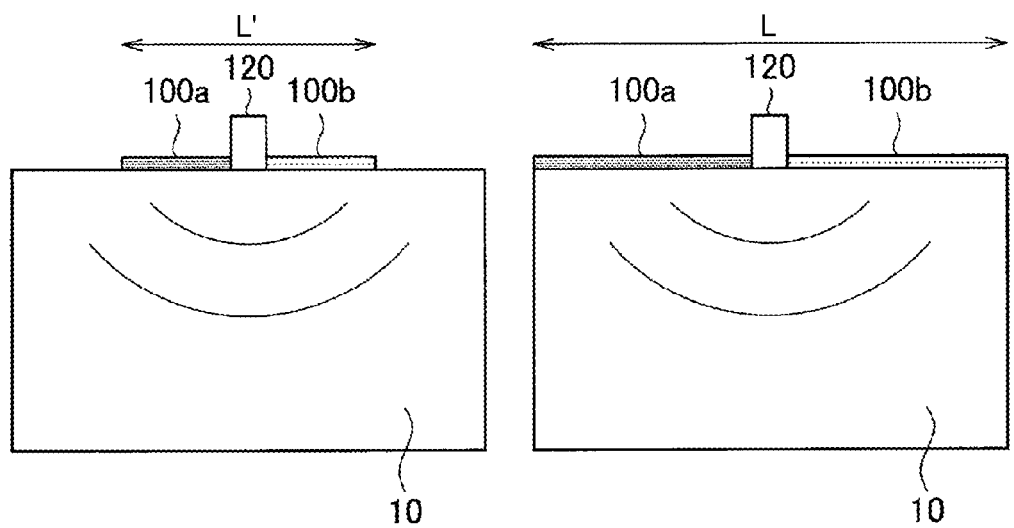
FIG. 7B is a schematic diagram illustrating an example of the antenna pattern.

FIG. 7B illustrates a first modification of the antenna pattern. The first modification shows an example in which two dimming elements are formed similarly to the basic form of FIG. 7A, and shows an example of a multiband antenna. In FIG. 7B, the lengths L and L' of the left and right dipole antennas are not equal, and have a relationship represented by the formula $L \neq L'$. For example, L=12.5 cm and L'=5.8 cm. Therefore, a 2.4 GHz band and a 5 GHz band can be used simultaneously, and the multiband antenna can be achieved.

Figure 7C:
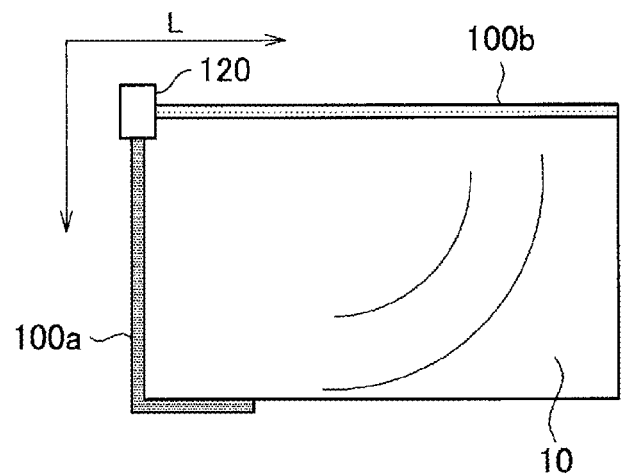
FIG. 7C is a schematic diagram illustrating an example of the antenna pattern.

FIG. 7C illustrates a second modification of the antenna pattern, and illustrates an example in which the directivity of the antenna is changed compared with FIGS. 7A and 7B. The two conductors 100a and 100b are provided on horizontal and vertical sides of the combiner 10. The connector 120 can be provided at any position on the outer periphery. For example, when the connector 120 is positioned at one of the four corners of the combiner 10, a directivity 45 degrees diagonally to the ground can be provided.

Figure 7D:
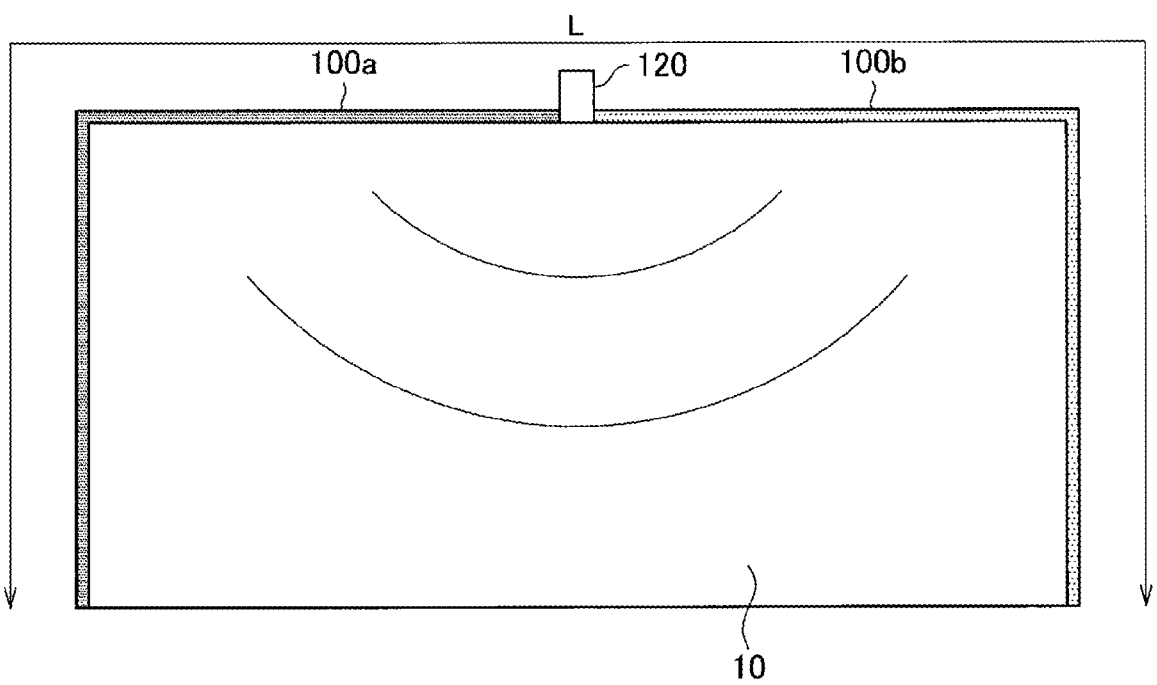
FIG. 7D is a schematic diagram illustrating an example of the antenna pattern.

FIG. 7D illustrates an example in which the dimming element includes one combiner 10. The one combiner 10 is positioned in front of the right eye and the left eye of the user and covers the right eye and the left eye. The length L of the dipole antenna is approximately 0.5 cm to 80 cm, and is approximately 375 MHz to 60 GHz in terms of frequency. Therefore, the present invention can be applied to One-seg mobile digital broadcasting, millimeter wave communication, and the like.

7. Configuration Example of System

Figure 8:
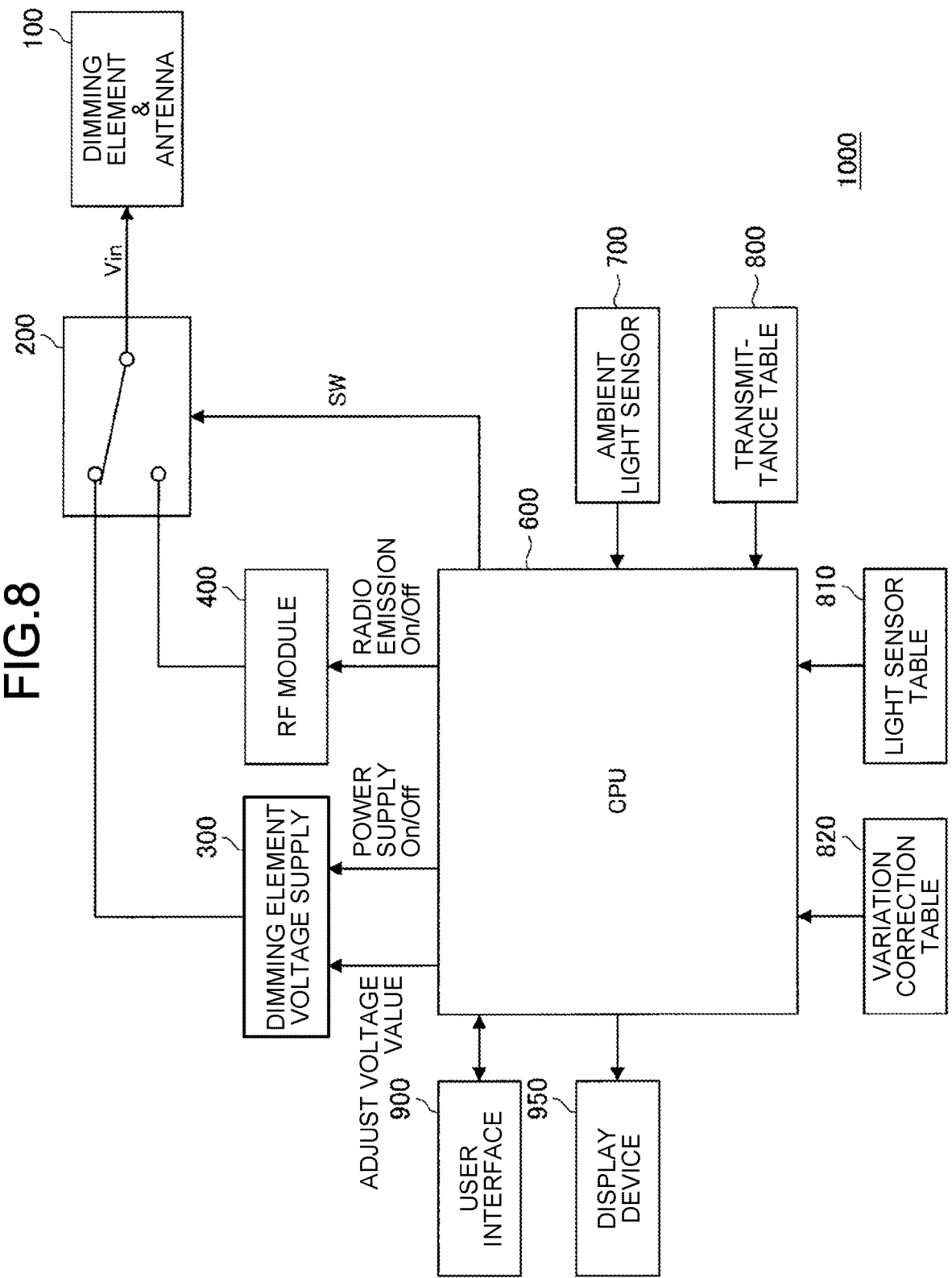
FIG. 8 is a schematic diagram illustrating a configuration of a system according to the present embodiment.

FIG. 8 is a schematic diagram illustrating a configuration of a system 1000 of the display device according to the present embodiment. As illustrated in FIG. 8, the system 1000 includes the conductor 100, the switch 200, the dimming element power supply 300, the RF module 400, a CPU 600, the ambient light sensor 700, the transmittance table 800, a light sensor table 810, the variation correction table 820, a user interface 900, and a display unit 950.

The ambient light sensor 700 is the sensor that detects the brightness of the external ambient light described with reference to FIG. 6. As described above, the larger the detection value of the ambient light sensor 700, the lower the set value for the transmittance. The transmittance table 800 corresponds to the table illustrated in FIG. 4. Furthermore, the light sensor table 810 corresponds to the table illustrated in FIG. 6, and the variation correction table 820 corresponds to the table illustrated in FIG. 5. The transmittance table 800, the light sensor table 810, and the variation correction table 820 are stored in a storage unit, such as ROM included in the display device.

The RF module 400 has a function as a wireless communication unit for external wireless communication. As described above, Bluetooth (registered trademark), Wi-Fi, millimeter wave communication, One-seg mobile digital broadcasting, or the like can be appropriately used as a wireless communication standard. Note that a wireless communication system is not limited thereto.

A user's operation is input to the user interface 900. The user can operate the user interface 900 to perform various operations such as setting the set value for the transmittance.

The display unit 950 is provided at the combiner 10 and presents information viewed by the user. In other words, the display unit 950 functions as a display unit for a see-through glass display provided on the combiner 10. Specifically, the display unit 950 is configured to display information acquired from outside by the RF module 400.

The CPU 600 refers to table values of the transmittance table 800, the light sensor table 810, and the variation correction table 820, and the user settings, determining a signal indicating the voltage value (drive voltage value) and power on/off timing for the dimming element, transmitting the signal to the dimming element power supply 300. In addition, the CPU 600 determines on/off timing for the RF module 400, and transmits the on/off timing to the RF module 400.

Furthermore, the CPU 600 transmits, as on/off signals for the switch 200, a signal indicating the power on/off timing for the dimming element and a signal indicating on/off timing for the RF module 400, to the switch 200.

When the set value for the transmittance is determined in advance by the user setting or the like, the table of FIG. 4 is referred to, and the dimming on time and the RF on time according to the set value for the transmittance are determined. Therefore, the CPU 600 is allowed to determine the power on/off timing for the dimming element to transmit the power on/off timing to the dimming element power supply 300. Likewise, the CPU 600 is allowed to determine the on/off timing for the RF module 400 and transmit the on/off timing to the RF module 400.

Note that after the RF module 400 itself is turned off, processing for establishing communication upon turning on the power is required. Therefore, the RF module 400 itself is always turned on, preventing the RF module 400 itself from being turned off. The on time of the RF module 400 corresponds to a time in which radio emission by the RF module 400 is enabled.

As described above, the CPU 600 is allowed to refer to the transmittance table 800 illustrated in FIG. 4 on the basis of the set value for the transmittance, determining the power on/off timing for the dimming element and the on/off timing for the RF module 400.

Furthermore, the voltage value (drive voltage value) for driving the dimming element is determined by referring to the table of FIG. 5. The CPU 600 is configured to determine a voltage value according to the set value for the transmittance and transmit the voltage value to the dimming element power supply 300.

In a case where the set value for the transmittance is determined in advance by the user setting or the like, the tolerance value for the transmittance, the dimming on time, the RF on time, the voltage value for driving the dimming element, and the like are determined on the basis of the set value for the transmittance determined in advance.

Furthermore, in a case where the set value for the transmittance is determined on the basis of the detection value of the ambient light sensor 700, the CPU 600 is allowed to refer to the table of FIG. 6 to determine the set value for the transmittance according to the detection value of the ambient light sensor 700. Therefore, the tolerance value for the transmittance, the dimming on time, the RF on time, the voltage value for driving the dimming element, and the like are determined on the basis of the set value for the transmittance according to the detection value of the ambient light sensor 700.

8. Process Performed in System

FIG. 9 is a flowchart illustrating a process performed by the system 1000 of FIG. 8. The process illustrated in FIG. 9 is basically performed by the CPU 600, and is performed every period of time in which predetermined control is performed. First, in Step S10, the variation correction table 820 is referred to, the drive voltage value for the dimming element is corrected, and the drive voltage value is determined. In the next Step S12, it is determined whether the automatic dimming mode is on, and if the automatic dimming mode is on, the process proceeds to Step S14.

In Step S14, the detection value of the ambient light sensor 700 is read. In the next Step S16, the light sensor table 810 is referred to, and the set value for the transmittance is determined on the basis of the detection value of the ambient light sensor 700. In the next Step S18, the transmittance table 800 is referred to, and the on/off time of the dimming element and the on/off time of the RF module 400 are set. After Step S18, the process ends.

Furthermore, if the automatic dimming mode is off in Step S12, the process proceeds to Step S20. In Step S20, it is determined whether the dimming element is in the first on state, and if the dimming element is in the first on state, the process proceeds to Step S22. In Step S22, the set value for the transmittance is read. Here, the operation mode is not the automatic dimming mode, and thus, the set value for the transmittance set by the user setting or the like is read.

In the next Step S24, the transmittance table 800 is referred to, and the on/off time of the dimming element and the on/off time of the RF module 400 are set on the basis of the set value for the transmittance. After Step S24, the process ends.

Furthermore, if the dimming element is not in the first on state in Step S24, the process ends. In this case, the on/off time of the dimming element and the on/off time of the RF module 400, which are set in Step S24 where the dimming element is in the first on state, are applied.

9. Adaptation of Period of Time for Dimming and Antenna

A relationship between the set value for the transmittance, the tolerance value for the transmittance, the dimming on time, and the RF on time which are illustrated in FIG. 4 can be changed by the user setting. Furthermore, the relationship between the set value for the transmittance, the tolerance value for the transmittance, the dimming on time, and the RF on time which are illustrated in FIG. 4 can be changed according to the type of an application of the display device.

In a case of changing by the user setting, the user operates the user interface 900, and thus the set value for the transmittance, the tolerance value for the transmittance, the dimming on time, and the RF on time can be changed.

In addition, in a case of changing according to the type of an application of the display device, an RF mode in which priority is given to use of the conductor as the RF antenna, a dimming mode in which priority is given to use of the conductor as the wiring applying a voltage to the dimming element, and the like can be set. For example, in a case where the application has a large volume of external communication, the RF mode is set to give priority to the function of the RF antenna, and the use as the wiring for applying a voltage to the dimming element is suppressed. In this case, the RF on time is relatively increased and the dimming on time is reduced.

Furthermore, in a case where priority is given to the visibility of the display, priority is given to the function of the dimming element to make the display clear to view. For example, when the visibility of an image to be displayed is enhanced under outdoor use conditions or when an alert is displayed, the visibility of the display is enhanced. In this case, the dimming on time is relatively increased and the RF on time is reduced. In an emergency, the RF on time may be set to zero for temporal communication disconnection. Such control that gives priority to the visibility of the display makes it possible to make the display of highly urgent information or information for the user clear to view.

As described above, in the case of changing according to the application, change of the dimming by giving priority to the function of the RF antenna, and change of the communication function by giving priority to the dimming function are assumed. Thus, the dimming on time and the RF on time can be optimally adjusted, and the periods of time of the dimming on time and the RF on time can be optimally adjusted.

10. Examples of Dimming Element

For the dimming element, for example, an electrochromic element or a liquid crystal shutter can be employed. The electrochromic element converts the transmittance by an oxidation or reduction reaction according to voltage applied. The liquid crystal shutter is an optical filter that uses a property of liquid crystal having light transmittance changed by applying a voltage.

In a case where the dimming element includes the electrochromic element, the dimming element 14 is constituted by holding a flat plate-shaped electrochromic element between two flat plate-shaped transparent electrodes. The oxidation or reduction reaction of the electrochromic element occurs according to voltage applied to the transparent electrodes on both sides of the electrochromic element, thus, controlling the transmittance.

11. Conclusion

As described above, according to the present embodiment, in the display device in which the dimming element is mounted on the combiner 10, the conductor 100 is configured to be used for both of the electrode wiring of the dimming element and the RF antenna and switched by the switch 200. Then, the drive voltage values for the dimming element and the RF antenna are dynamically changed in synchronization with the switching by the switch 200. Therefore, it is also possible to improve the responsiveness of the dimming element in addition to the antenna function of the conductor 100.

Furthermore, in switching the switch 200, the on time of the dimming element and the on time of the RF communication are adjusted while the RF antenna is turned on so that the transmittance does not exceed the tolerance value for the transmittance set in advance, and thus, the user is less likely to feel the change in transmittance during the switching.

Furthermore, a table for correcting the drive voltage value for each dimming element is provided in order to correct the variation in the transmittance due to the variation in manufacturing the dimming elements, and the transmittance is optimally adjusted without being affected by the variation in manufacturing the dimming elements. Furthermore, in the automatic dimming mode, the ambient light sensor 700 is used to enable automatic adjustment of the transmittance according to the brightness of the ambient light.

Preferred embodiments of the present disclosure have been described above in detail with reference to the accompanying drawings, but the technical scope of the present disclosure is not limited to these examples. A person skilled in the art may obviously find various alternations and modifications within the technical concept described in claims, and it should be understood that they will naturally come under the technical scope of the present disclosure.

Furthermore, the effects descried herein are merely explanatory or exemplary effects, and not limitative. In other words, the technology according to the present disclosure can achieve other effects that are apparent to those skilled in the art from the description herein, along with or instead of the above effects.

Additionally, the present technology may also be configured as below.

(1)

A light transmissive display device comprising:
a conductor to which a voltage for changing transmittance of the dimming element and a voltage outputting an electromagnetic wave for communication are applied in a time division manner; and
a light transmitting member that is provided with a conductor and transmits light passing through the dimming element.

(2)

The light transmissive display device according to (1), wherein the dimming element applies a first voltage to the conductor in a first period of time to change the transmittance of the dimming element.

(3)

The light transmissive display device according to (2), wherein to the conductor, a second voltage is applied in a second period of time to output the electromagnetic wave for communication.

(4)

The light transmissive display device according to (3), further comprising
a switch that switches the first voltage and the second voltage to be applied to the conductor,
wherein the first voltage is applied to the conductor from a dimming element power supply in the first period of time, and the second voltage is applied to the conductor from an RF module in the second period of time.

(5)

The light transmissive display device according to (3) or (4), wherein a time interval of the first period of time or the second period of time changes according to the transmittance being a predetermined transmittance.

(6)

The light transmissive display device according to any one of (3) to (5), wherein the higher the transmittance, the longer the second period of time.

(7)

The light transmissive display device according to any one of (2) to (6), wherein the transmittance increases from a beginning to an end of the first period of time with a predetermined tolerance value as an upper limit.

(8)

The light transmissive display device according to any one of (1) to (7), wherein the transmittance is determined according to brightness of ambient light, and the brighter the ambient light, the lower the transmittance.

(9)

The light transmissive display device according to any one of (2) to (7), wherein the first voltage is corrected based on a correction table that stores a relationship between the first voltage and the transmittance according to variation in manufacturing the dimming elements.

(10)

The light transmissive display device according to any one of (1) to (9), wherein the light transmissive display device is a head mounted display, and the light transmitting member is arranged in front of a user's eye.

(11)

The light transmissive display device according to (10), further comprising a display unit that provides display visible by the user.

(12)

The light transmissive display device according to any one of (1) to (11), further comprising a mode in which a function as the antenna has priority over a function as the dimming element.

(13)

The light transmissive display device according to (12), wherein the mode is set according to a volume of external communication through the antenna.

(14)

The light transmissive display device according to (11), wherein the conductor includes a mode in which a function of controlling transmittance of the dimming element has priority over a function as the antenna, according to a type of an application.

(15)

The light transmissive display device according to (14), wherein when the application gives priority to visibility of display, the conductor gives priority to the function of controlling the transmittance of the dimming element.

(16)

The light transmissive display device according to any one of (1) to (15), wherein the dimming element includes an electrochromic element.

(17)

The light transmissive display device according to any one of (1) to (15), wherein the dimming element includes a liquid crystal shutter.

(18)

A dimming method comprising:

causing a conductor to function as a dimming element that changes transmittance, in a first period of time; and causing the conductor to function as an antenna for communication, in a second period of time.

(19)

A program for causing a computer to function as:

a unit causing a conductor to function as a dimming element changing transmittance, in a first period of time; and a unit causing the conductor to function as an antenna for communication, in a second period of time.

REFERENCE SIGNS LIST

10 COMBINER
100 CONDUCTOR
200 SWITCH
300 DIMMING ELEMENT POWER SUPPLY
400 RF MODULE
700 AMBIENT LIGHT SENSOR
800 TRANSMITTANCE TABLE
810 LIGHT SENSOR TABLE
820 VARIATION CORRECTION TABLE
900 USER INTERFACE
950 DISPLAY UNIT

The invention claimed is:

1. A light transmissive display device, comprising:
   a conductor configured to be applied, in a time division manner, a voltage to change transmittance of a dimming element and a voltage that outputs an electromagnetic wave for communication; and
   a light transmitting member that comprises the conductor, wherein the light transmitting member is configured to transmit light passing through the dimming element, wherein
   the dimming element applies a first voltage to the conductor in a first period of time to change the transmittance of the dimming element, and
   wherein the transmittance increases from a beginning to an end of the first period of time with a specific tolerance value as an upper limit.

2. The light transmissive display device according to claim 1, wherein to the conductor, a second voltage is applied in a second period of time to output the electromagnetic wave for communication.

3. The light transmissive display device according to claim 2, further comprising a switch configured to switch the first voltage and the second voltage to be applied to the conductor,
   wherein the first voltage is applied to the conductor from a dimming element power supply in the first period of time, and the second voltage is applied to the conductor from an RF module in the second period of time.

4. The light transmissive display device according to claim 2, wherein a time interval of the first period of time or the second period of time changes based on the transmittance being a specific transmittance.

5. The light transmissive display device according to claim 2, wherein the transmittance is directly proportional to a length of the second period of time.

6. The light transmissive display device according to claim 1, wherein
   the transmittance is based on brightness of ambient light, and
   the transmittance is inversely proportional to the brightness of the ambient light.

7. The light transmissive display device according to claim 1, wherein
   the first voltage is corrected based on a correction table, and
   the correction table stores a relationship between the first voltage and the transmittance based on variation in manufacture of dimming elements.

8. The light transmissive display device according to claim 1, wherein
   the light transmissive display device is a head mounted display, and
   the light transmitting member, in a wearable state, is in front of an eye of a user.

9. The light transmissive display device according to claim 8, further comprising a display unit configured to provide display viewable by the user.

10. The light transmissive display device according to claim 1, further comprising a mode in which a function as an antenna has priority over a function as the dimming element.

11. The light transmissive display device according to claim 10, wherein the mode is based on a volume of external communication through the antenna.

12. The light transmissive display device according to claim 9, wherein the conductor includes a mode in which a function to control the transmittance of the dimming element has priority over a function as an antenna, based on a type of an application.

13. The light transmissive display device according to claim 12, wherein when the application gives priority to visibility of display, the conductor is configured to prioritize the function to control the transmittance of the dimming element.

14. The light transmissive display device according to claim 1, wherein the dimming element includes an electrochromic element.

15. The light transmissive display device according to claim 1, wherein the dimming element includes a liquid crystal shutter.

16. A dimming method, comprising:
controlling a conductor to function as a dimming element that changes transmittance, in a first period of time; and
controlling the conductor to function as an antenna for communication, in a second period of time, wherein
the dimming element applies a first voltage to the conductor in the first period of time to change the transmittance of the dimming element, and
wherein the transmittance increases from a beginning to an end of the first period of time with a specific tolerance value as an upper limit.

17. A non-transitory computer-readable medium including computer-executable instructions, which when executed by a computer, causes the computer to execute operations, the operations comprising:
controlling a conductor to function as a dimming element changing transmittance, in a first period of time; and
controlling the conductor to function as an antenna for communication, in a second period of time, wherein
the dimming element applies a first voltage to the conductor in the first period of time to change the transmittance of the dimming element, and
wherein the transmittance increases from a beginning to an end of the first period of time with a specific tolerance value as an upper limit.

\* \* \* \* \*